May 14, 1929.    N. G. MORICI    1,712,512
POWER TRANSMISSION DEVICE
Filed Nov. 28, 1924    5 Sheets-Sheet 1

Witnesses:
W.T. Kilroy
Harry B. L. White

Inventor:
Nazarene George Morici
By ........ Atty's

May 14, 1929.  N. G. MORICI  1,712,512

POWER TRANSMISSION DEVICE

Filed Nov. 28, 1924   5 Sheets-Sheet 2

Witnesses:
W. P. Kilroy
Harry R. LeWhite

Inventor:
Nazarene George Morici

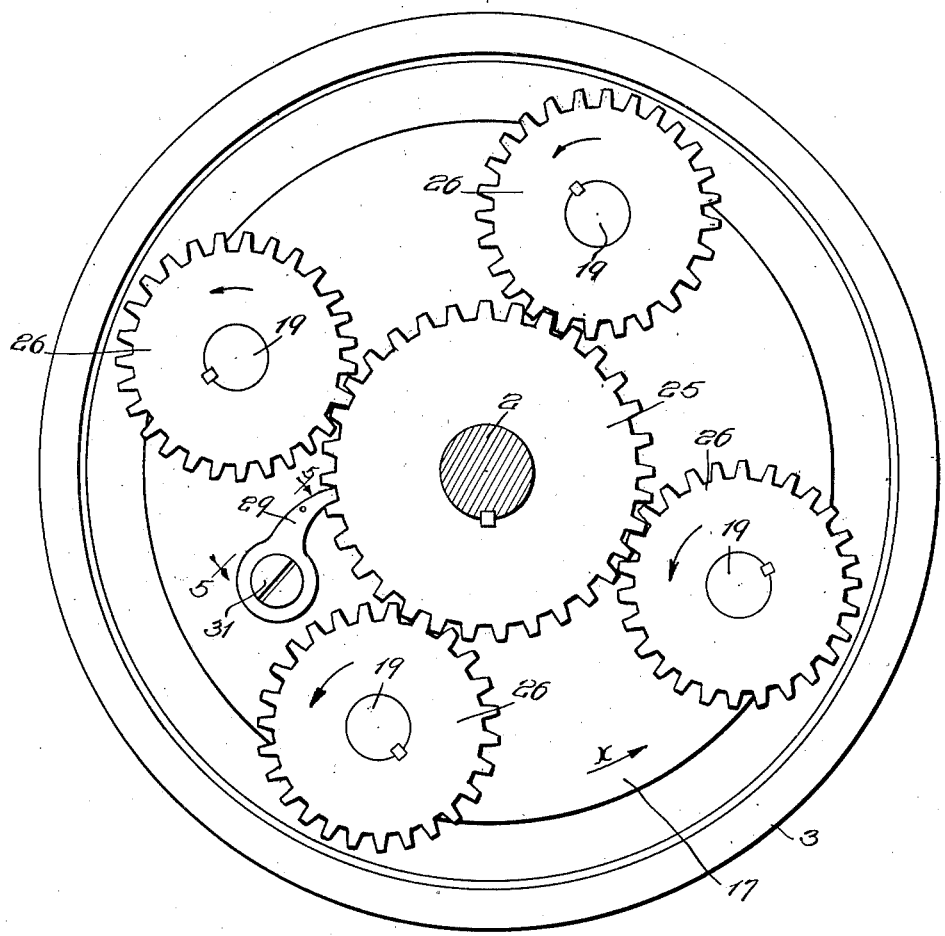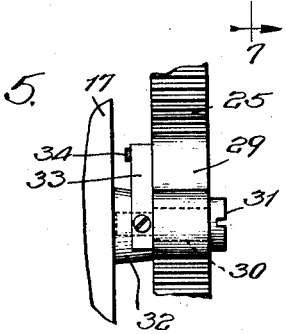

May 14, 1929.   N. G. MORICI   1,712,512
POWER TRANSMISSION DEVICE
Filed Nov. 28, 1924   5 Sheets-Sheet 4

Witnesses:
W. P. Kilroy
Harry R. Leehett

Inventor:
Nazarene George Morici
By
Attys

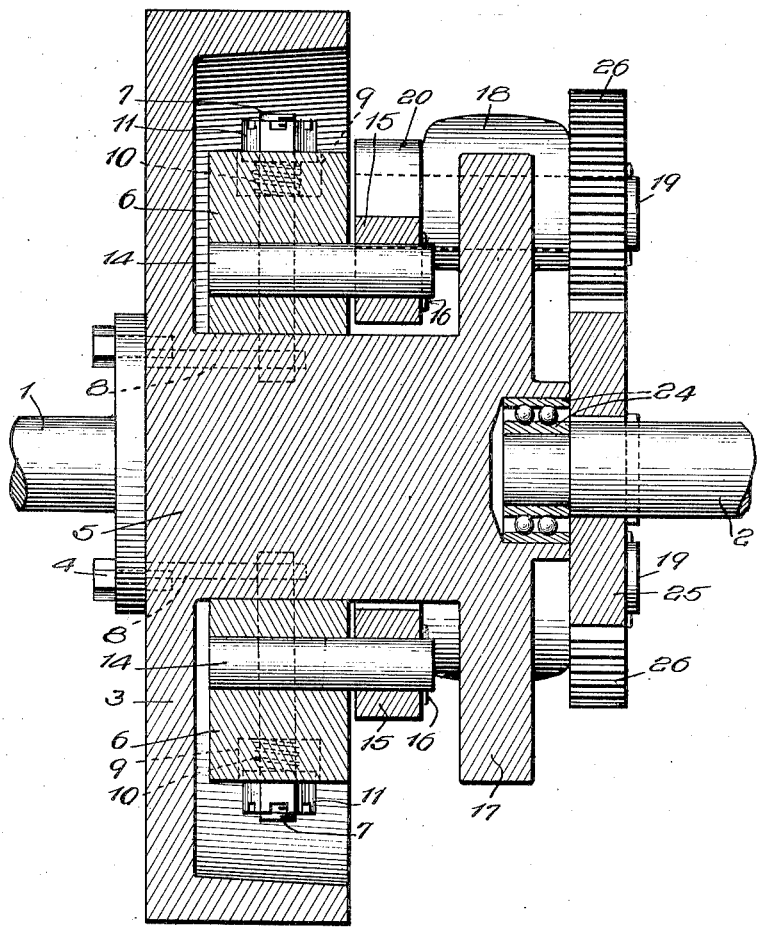

Patented May 14, 1929.

1,712,512

UNITED STATES PATENT OFFICE.

NAZARENE GEORGE MORICI, OF CHICAGO, ILLINOIS.

POWER-TRANSMISSION DEVICE.

Application filed November 28, 1924. Serial No. 752,672.

My invention belongs to that general class of devices known as power transmission devices, and relates more particularly to a device especially adapted for use in connection with internal combustion engines, electrical motors and the like, for transmitting power from a suitable source to a driven element. The invention has among its objects the production of a device of the kind described that is simple, compact, reliable, durable, convenient, efficient and satisfactory for use wherever found applicable. More particularly it has as an object the production of a device especially adapted for motor vehicle use and which obviates the use of the usual clutch and is substantially automatic in operation. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 4 is a sectional view taken substantially on line 4—4 of Fig. 1;

Fig. 5 is a sectional view taken substantially on line 5—5 of Fig. 4;

Fig. 7 is a sectional view taken substantially in line 7—7 of Fig. 4.

Figure 6:
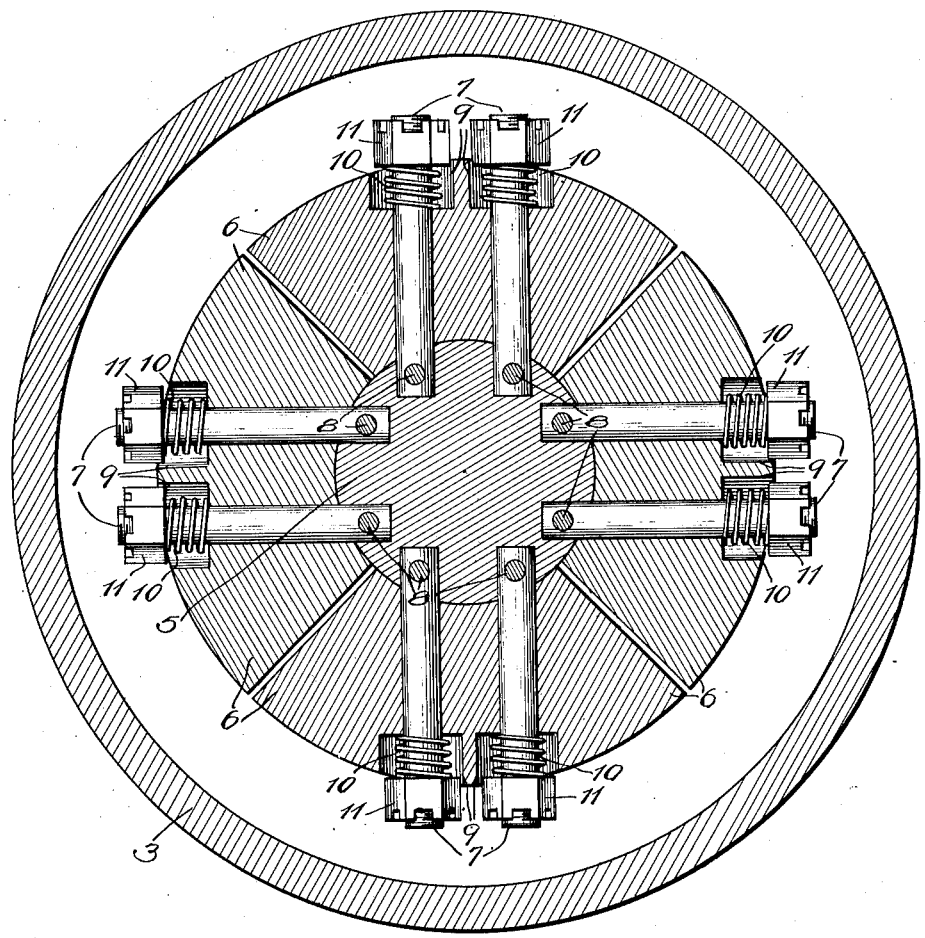
Fig. 6 is a sectional view taken substantially on line 6—6 of Fig. 1.

Referring to the drawings, in which the preferred embodiment of the invention is shown, 1 represents a driving element such as the crank shaft of an internal combustion engine, the armature shaft of an electrical motor, or a shaft driven by any other source of power, while 2 represents a driven element, as a shaft, operatively connected with any mechanism (not shown) desired to be driven. I have shown a fly wheel 3 carried by the driving shaft 1, the shaft and fly wheel, however, in themselves representing any driving mechanism. For purposes of illustration, I shall describe my device in connection with an internal combustion engine used for driving an automobile, it being understood, however, that its use is not so limited. The fly wheel 3 may be secured to the shaft 1 in any suitable manner, bolts 4 being shown for the purpose, which bolts are also arranged to carry an element 5 of suitable size, shape and material. Mounted on the member 5 are the desired number of members 6. Normally at idling, or low speeds of the driving shaft 1, these members take positions substantially as shown in Fig. 6, and may rest upon the member 5. They are adjustably mounted on 5 by means of bolts 7, which may be secured to 5 by means of pins 8 or equivalent means. As shown, the members 6 are recessed, as indicated at 9, and springs 10 arranged on the member 7, the same abutting against the members 6 and nuts 11 arranged on the pin 7. These springs tend to normally maintain the parts as shown, but when 5 is speeded up or rotated at higher speeds, members 6, due to the centrifugal force, move outwardly, compressing the springs 10. As soon as the speed is reduced, however, the springs move the members back inwardly the axis of rotation of 5.

There may be any number of members 6, four being shown in the drawings. Each member 6 carries a pin or stud 14 upon which is arranged a roll 15, the same being maintained on the stud by a cotter pin 16 or any equivalent means for the purpose. Part 5 is provided with a flange portion 17 formed integrally therewith, as shown, or separate therefrom and secured thereto, this detail of construction being immaterial.

The flange 17 is shown provided with bosses 18 which carry stud shafts 19, each of which is provided with a roll 20 arranged to cooperate with the roll 15, as hereinafter described.

The end of shaft 2 may be supported in any suitable manner, an anti-friction bearing 24 of any suitable construction being preferably provided in the end of the member 5. Suitably secured on shaft 2 is a gear 25 arranged to mesh with gears 26 carried by the stud shafts 19. I have shown a pawl 29 mounted on a suitable support and arranged to cooperate with the gear 25, as will be hereinafter described. This pawl is shown mounted on a pin or screw 30 having a head 31 and carried by the boss 32 on 17. A spring 33 secured to the boss and cooperating with the pin 34 on the pawl tends to normally prevent the pawl from being thrown out of engaging position, owing to any centrifugal force when member 17 is rotated.

Figure 1:
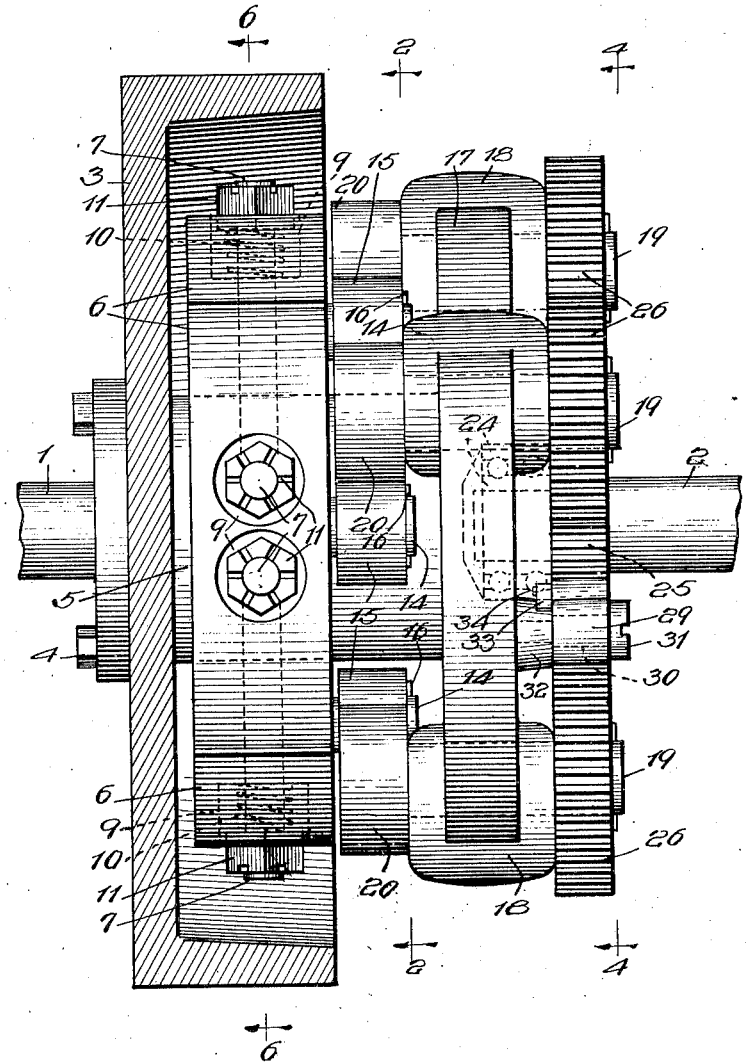
Figure 1 is a side elevation of my improved device, a portion cut away to show the construction.
Figure 2:
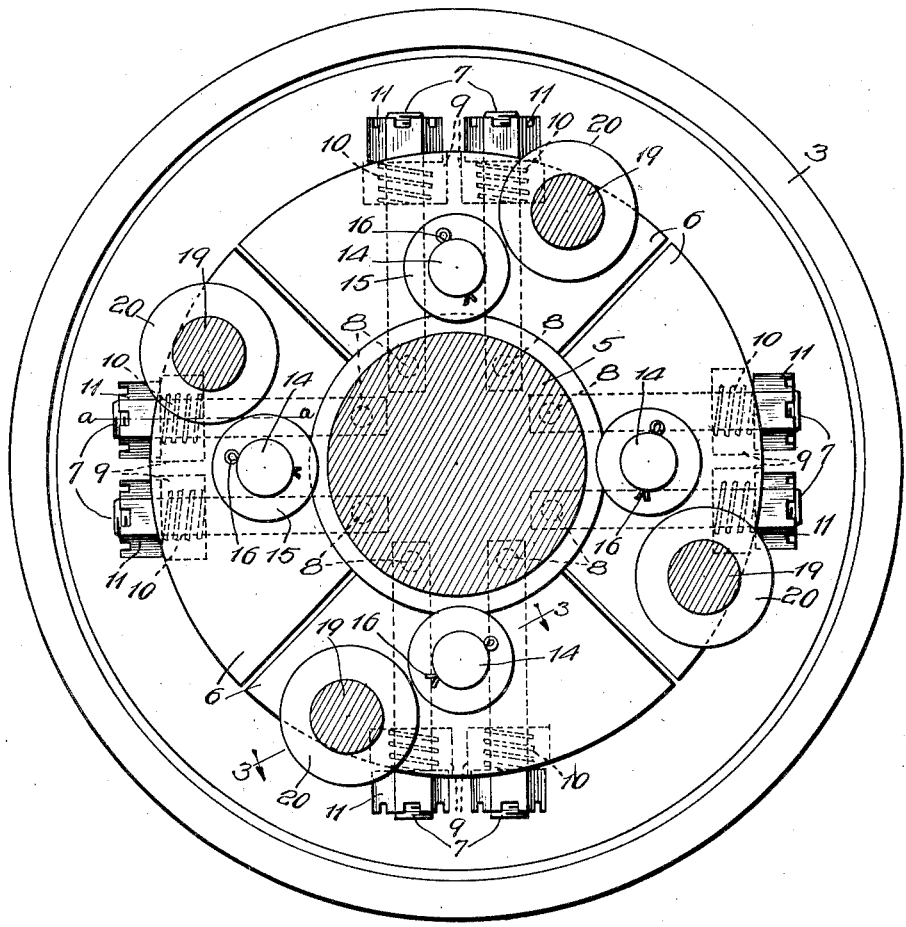
Fig. 2 is a sectional view taken substantially on line 2—2 of Fig. 1.
Figure 3:
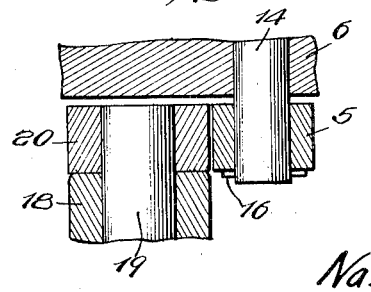
Fig. 3 is a sectional view taken substantially on line 3—3 of Fig. 2.

In describing the operation of the device, it may be assumed that the same is applied to an automobile and that 1 represents the crank shaft of the engine and 2 the drive shaft, which may be connected to the drive wheels in any suitable manner, preferably through a transmission device (not shown) which will provide a reversing mechanism for the drive wheels as well as a neutral connection or permit them to be disconnected as it were. Inasmuch as any neutral and reverse gear or transmission may be employed for the purpose, I have not considered it necessary to show the same in detail herein. It will be noted by referring to Fig. 2 that the studs 14 and 19 are so arranged relative each other, or at such distance from the axis of rotation of the parts, and the rolls 15 and 20 so proportioned, that when the parts are at rest, there is a slight clearance between the rolls. This is the preferred construction, although this clearance may be so small as to be practically nothing.

When the car is idling at low speed, for example, 150 R. P. M., or thereabouts, springs 10 hold down the members or weights 6 so that there is a small clearance of say five-thousandths of an inch between the rolls 20 and the idler rolls 15. There being no fixed connection between the driven shaft 2 and the driving shaft 1, the gears 26 idling will revolve or race around the central driving gear 25 without transmitting any power to the driven shaft 2, and this happens because studs or rolls 20 are free on their bearings. As soon as the motor accelerates, however, the centrifugal force overcomes the tension of the springs 10 and the idler rolls 15 are thrown into contact with the rolls or studs 20. Now the rolls 20 are revolving as indicated by the arrows; this being the case, the pull exerted by rollers 15 against rolls 20 will tend to overcome or retard the rotation of 20 and gears 26 in their bearings, the pull acting along the dotted line a—a (see Fig. 2) and not toward the center of the studs. This is not a wedging effect, but rather a leverage action. It acts in the same manner as two forces acting at opposite ends of a lever having a central pivot. Now as the speed of the motor increases, that leverage action increases due to the centrifugal force, and at the same time the motion of the studs 20 will be retarded; and if the speed is great enough, they will stop revolving altogether and the whole mechanism will revolve as a unit in the direction indicated by arrow X in Figure 4. It will be noted, however, that the tendency is for them to pick up the load gradually, owing to the slipping between the rolls 15 and 20. These rolls may be constructed as desired or provided with any suitable facing, although I have found that hardened material is satisfactory without a supplemental facing.

Obviously, as the speed of the shaft 1 is increased, the locking becomes all the more positive. When used on an automobile provided with a transmission gear, as before mentioned, with the reverse gear, and also with the neutral, the engine may be started and driven. If the transmission is thrown into gear and then the speed of the engine increased, my device will smoothly pick up the load and drive the driven shaft and the vehicle. Increasing the speed of the engine will increase the speed of the vehicle. If the engine is slowed down, as for example, by closing the throttle or releasing the accelerator, the device will immediately disengage. In driving in traffic, it is not necessary to touch the transmission at all as the car may be started and stopped by controlling the speed of the engine. By providing the pawl 29, it is not possible to disconnect the driving and driven shafts accidentally in going down hill, and the driver can apply his brakes and still have the engine connected up with the rear wheels. The ratchet brakes the car and provides a positive connection so to crank the engine if the car is pushed or pulled.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. The combination with a driving element and a driven element, of apparatus operatively connecting said elements and comprising a weight bodily rotatable with said driving element around the axis of rotation of said driving element and adapted to move away from said axis of rotation when subjected to centrifugal force, said weight being constrained to move in a plane arranged transversely of said axis of rotation and at right angles thereto, a gear constrained to rotate with the driven element around the axis of rotation of the driving element, a pinion meshing with said gear and rotatable around its own longitudinal axis, a member constrained to rotate with the pinion around its longitudinal axis, said pinion and said member being constrained to rotate bodily in planes disposed substantially parallel to the first-mentioned plane, and means constrained to move bodily with the weight and engageable with said member to retard and prevent rotation of the pinion around its longitudinal axis.

2. The combination with a driving element and a driven element, of apparatus operatively connecting said elements and comprising a weight bodily rotatable with said driving element around the axis of rotation of said driving element and adapted to move away from said axis of rotation when subjected to centrifugal force, said weight being constrained to move in a plane arranged transversely of said axis of rotation and at right angles thereto, a gear constrained to rotate with said driven element, a pinion meshing with said gear and rotatable around its own longitudinal axis, said pinion being constrained to rotate with the driving element around the axis of rotation of the driving element, a member constrained to rotate with the pinion around its longitudinal axis, and an anti-friction roller constrained to move bodily with the weight and engageable with said member to retard and prevent rotation of the pinion around its longitudinal axis.

3. The combination with a driving element and a driven element, of apparatus operatively connecting said elements and comprising a weight bodily rotatable with said driving element around the axis of rotation of said driving element and adapted to move away from said axis of rotation when subjected to centrifugal force, said weight being constrained to move in a plane arranged transversely of said axis of rotation and at right angles thereto, a gear constrained to rotate with said driven element, a pinion meshing with said gear and rotatable around its own longitudinal axis, said pinion being constrained to rotate with the driving element around the axis of rotation of the driving element, a member constrained to rotate with the pinion around its longitudinal axis, and means constrained to move bodily with the weight and engageable with said member to retard and prevent rotation of the pinion around its longitudinal axis.

In testimony whereof, I have hereunto signed my name.

NAZARENE GEORGE MORICI.